(12) United States Patent
Morman et al.

(10) Patent No.: US 6,900,147 B2
(45) Date of Patent: May 31, 2005

(54) NONWOVEN WEBS HAVING IMPROVED NECKING UNIFORMITY

(75) Inventors: Michael T. Morman, Alpharetta, GA (US); Charles J. Morell, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 490 days.

(21) Appl. No.: 09/995,537

(22) Filed: Nov. 28, 2001

(65) Prior Publication Data

US 2003/0100238 A1 May 29, 2003

(51) Int. Cl.⁷ .......................... D04H 3/10; D04H 13/00; D04H 1/46; D04H 1/00; B32B 23/02
(52) U.S. Cl. .................. 442/327; 428/192; 428/193; 428/194; 442/400; 442/401; 442/402; 442/403; 442/404; 442/405; 442/406; 442/407; 442/408; 442/359; 442/333
(58) Field of Search ................. 428/192–194; 442/327, 400–408, 333, 359

(56) References Cited

U.S. PATENT DOCUMENTS

| | | | |
|---|---|---|---|
| 3,692,618 A | 9/1972 | Dorschner et al. | |
| 3,849,241 A | 11/1974 | Butin et al. | |
| 3,949,127 A | 4/1976 | Ostermeier et al. | |
| 4,016,319 A | * 4/1977 | Marshall | 428/113 |
| 4,100,324 A | 7/1978 | Anderson et al. | |
| 4,295,251 A | 10/1981 | Tatham et al. | |
| 4,340,563 A | 7/1982 | Appel et al. | |
| 4,443,513 A | 4/1984 | Meitner et al. | |
| 4,663,220 A | 5/1987 | Wisneski et al. | |
| 4,720,415 A | 1/1988 | Vander Wielen et al. | 428/152 |
| 4,741,949 A | 5/1988 | Morman et al. | |
| 4,762,520 A | 8/1988 | Wallstrom | 604/366 |
| 4,789,699 A | 12/1988 | Kieffer et al. | |
| 4,965,122 A | 10/1990 | Morman | |
| 5,028,289 A | 7/1991 | Rasmussen | 156/229 |
| 5,116,662 A | 5/1992 | Morman | |

(Continued)

FOREIGN PATENT DOCUMENTS

| | | | | |
|---|---|---|---|---|
| EP | 0 396 800 A1 | 11/1990 | | |
| GB | 2114174 | * 8/1983 | ............ | D04H/1/46 |
| JP | 09 285488 A | 11/1997 | | |
| WO | WO 92/16371 | 10/1992 | ........... | B32B/31/00 |
| WO | WO 99/37841 | 7/1999 | | |
| WO | WO 00/16974 | 3/2000 | ............ | B32B/7/00 |
| WO | WO 00/29199 | 5/2000 | ........... | B29C/55/18 |
| WO | WO 01/00915 | 1/2001 | ............ | D04H/1/54 |
| WO | WO 01/12427 | 2/2001 | ............ | B32B/3/00 |
| WO | WO 01/30563 | 5/2001 | ............ | B32B/5/02 |

*Primary Examiner*—Terrel Morris
*Assistant Examiner*—Lynda M Salvatore
(74) *Attorney, Agent, or Firm*—Pauley Petersen & Erickson

(57) ABSTRACT

A neckable nonwoven web is provided with a central region and two edge regions, the central region being selectively easier to neck than the two edge regions. The nonwoven fibers in the central region have a polymer composition and/or physical properties which differ from the nonwoven fibers in the two edge regions. The selectively easier necking in the central region causes the central region to neck to about the same extent as the two edge regions, which otherwise would experience greater necking than the central region if the starting nonwoven web were completely uniform. Necked nonwoven webs and neck-bonded laminates made using the improved neckable nonwoven web, are also provided.

50 Claims, 3 Drawing Sheets

U.S. PATENT DOCUMENTS

| | | | |
|---|---|---|---|
| 5,156,793 A | 10/1992 | Buell et al. ............... 264/288.8 |
| 5,336,545 A | 8/1994 | Morman |
| 5,366,793 A | 11/1994 | Fitts, Jr. et al. ............. 428/198 |
| 5,456,971 A * | 10/1995 | Fahmy ....................... 428/212 |
| 5,492,753 A | 2/1996 | Levy et al. ................. 428/219 |
| 5,514,470 A | 5/1996 | Haffner et al. |
| 5,560,793 A | 10/1996 | Ruscher et al. ............ 156/73.1 |
| 5,622,772 A * | 4/1997 | Stokes et al. ............... 442/401 |
| 5,707,468 A | 1/1998 | Arnold et al. |
| 5,755,902 A | 5/1998 | Reynolds .................... 156/73.1 |
| 5,789,065 A | 8/1998 | Haffner et al. .............. 428/152 |
| 5,807,292 A | 9/1998 | Delmore |
| 5,883,028 A | 3/1999 | Morman et al. |
| 6,001,460 A | 12/1999 | Morman et al. ............ 428/195 |
| 6,069,097 A | 5/2000 | Suzuki et al. ............... 442/328 |
| 6,255,236 B1 | 7/2001 | Cree et al. .................. 442/328 |

\* cited by examiner

NONWOVEN WEBS HAVING IMPROVED NECKING UNIFORMITY

FIELD OF THE INVENTION

This invention is directed to nonwoven webs which, when exposed to a necking process, exhibit improved necking uniformity across the cross-directional width of the webs. The resulting necked nonwoven webs have more uniform basis weights across their width, compared to conventional necked nonwoven webs which tend to have a lower basis weight in the central region than in both edge regions.

BACKGROUND OF THE INVENTION

Necked nonwoven webs, including necked spunbond webs, meltblown webs, combinations, and the like, are often made using a process which is schematically illustrated in FIG. 1. A nonwoven web 12 having a starting width A is passed in its machine direction between a first nip 16, which can be a first pair of nip rollers traveling at a first surface velocity, and a second nip 26, which can be a second pair of nip rollers traveling at a second surface velocity which is faster Man the first surface velocity. The surface velocity difference between the first and second nips results in formation of a narrower ("necked") nonwoven web 22 having a necked width A' which is less than the starting width A. The second average surface velocity is about 1.05–1.7 times the first average surface velocity, suitably about 1.1–1.5 times the first average surface velocity, desirably about 1.2–1.4 times the first average surface velocity.

The necked nonwoven web 22 generally includes fibers which are closer together and more aligned in the machine direction than the fibers of the starting nonwoven web 12, which can be more randomly aligned. While compacting and aligning the fibers, the necking process generally does not stretch individual fibers. The necking may be performed with the aid of heat applied below the melting temperature of the fibers, for instance, by placing an oven or other heat source between the first and second nips. The necked nonwoven web 22 may also be heat set, either during or after the necking process, so that the necked web becomes somewhat stable. A nonwoven web which is stable in the necked condition is said to be "reversibly necked." A reversibly necked nonwoven web can be easily extended in the cross direction by applying a small extension force, and tends to return to its narrower, necked configuration when the extension force is released.

The starting nonwoven web 12 includes edge regions 13 and 15, and a central region 11. The necked nonwoven web 22 includes edge regions 23 and 25, and a central region 21. Because the necking causes the nonwoven fibers to become closer together and more aligned, without noticeably stretching or narrowing the individual fibers, the necked nonwoven web 22 generally has a higher basis weight than the starting nonwoven web 12.

As can be easily seen from FIG. 1, the nonwoven fibers in the edge regions 13 and 15 of the starting nonwoven web are subject to different strain, and travel a greater distance between the first nip 16 and the second nip 26 of the necking process, than the fibers in the central region 11. Furthermore, the cross-directional stresses in the central region 11 are at least partially counteracted, because these stresses are applied in both cross directions. The cross-directional stresses in each of the edge regions 13 and 15 are primarily in one direction, inward toward the center of the web. This results in increased fiber gathering and necking in the edge regions. Consequently, the fibers in the edge regions 23 and 25 of the necked nonwoven web are generally more aligned and closer together than the fibers in the central region 21. As a result, the necked nonwoven web may be nonuniform in the cross direction, having a higher basis weight in both edge regions than in the central region, and having greater cross-directional extendibility in both edge regions than in the central region.

There is a need or desire for neckable nonwoven materials which produce necked nonwoven webs having better cross-directional uniformity. There is also a need or desire for necked nonwoven webs, and laminates containing necked nonwoven webs, which have better cross-directional uniformity.

DEFINITIONS

As used herein, the term "recover" refers to a contraction of a stretched material upon termination of a biasing force following stretching length of the material by application of the biasing force. For example, if a necked material having a relaxed, unbiased width of one (1) inch is elongated 50 percent in the cross direction by stretching to a width of one and one half (1.5) inches the material would be elongated 50 percent (0.5 inch) and would have a stretched width that is 150 percent of its relaxed width. If this exemplary stretched material relaxed, and recovered to a width of one and one tenth (1.1) inches after release of the biasing and stretching force, the material would have recovered 80 percent (0.4 inch) of its one-half (0.5) inch elongation. Recovery may be expressed as [(maximum stretched dimension minus final sample dimension)/(maximum stretched dimension minus initial sample dimension)]×100.

As used herein the term "nonwoven web" means a web that has a structure of individual fibers or threads which are interlaid, but not in an identifiable repeating manner. Nonwoven webs have been, in the past, formed by a variety of processes such as, for example, melt-blowing processes, spunbonding processes and bonded carded web processes.

As used herein the term "microfibers" means small diameter fibers having an average diameter not greater than about 100 microns, for example, having a diameter of from about 0.5 microns to about 50 microns, more specifically microfibers may also have an average diameter of from about 4 microns to about 40 microns.

As used herein, the term "interfiber bonding" means bonding produced by thermal bonding or entanglement between the individual nonwoven fibers to form a coherent web structure. Fiber entangling is inherent in the meltblown processes but may be generated or increased by processes such as, for example, hydraulic entangling or needlepunching. One or more thermal bonding steps are employed in most processes for forming spunbond webs. Alternatively and/or additionally, a bonding agent can be utilized to increase the desired bonding and to maintain structural coherency of the web. For example, powdered bonding agents and chemical solvent bonding may be used.

As used herein, the term "meltblown fibers" means fibers formed by extruding a molten thermoplastic material through a plurality of fine, usually circular, die capillaries as molten threads or filaments into a high velocity gas (e.g., air) stream which attenuates the filaments of molten thermoplastic material to reduce their diameters, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, the disclosure of which is hereby incorporated by reference.

As used herein, the term "spunbonded fibers" refers to small diameter fibers which are formed by extruding a molten thermoplastic material as filaments from a plurality of fine, usually circular, capillaries in a spinneret with the diameter of the extruded filaments then being rapidly reduced, for example, by eductive drawing or other well-known spun bonding mechanisms. The production of spunbonded nonwoven webs is illustrated in patents such as, for example, in U.S. Pat. No. 4,340,563 to Appel et al., and U.S. Pat. No. 3,692,618 to Dorschner et al. The disclosures of both these patents are hereby incorporated by reference.

As used herein, the term "different fibers" refers to fibers or groups of fibers having different polymer compositions and/or physical properties, such that a first group of fibers is selectively easier to neck under set necking conditions than a second group of different fibers.

As used herein, the term "necked material" refers to any material which has been constricted in at least one dimension by processes such as, for example, drawing or gathering.

As used herein, the term "neckable material" means any material which can be necked.

As used herein, the "central region" of a nonwoven web is defined as the central 70% of the cross-directional width of the nonwoven web. The "edge regions" are defined as the outermost 15% of the width on both sides of the central region of the nonwoven web.

As used herein, the term "reversibly necked material" refers to a necked material that has been treated while necked to impart memory to the material so that, when a force is applied to extend the material to its pre-necked dimensions, the necked and treated portions will generally recover to their necked dimensions upon termination of the force. One form of treatment is the application of heat. Generally speaking, extension of the reversibly necked material is substantially limited to extension to its pre-necked dimensions. Therefore, unless the material is elastic, extension too far beyond its pre-necked dimensions will result in material failure. A reversibly necked material may include more than one layer, for example, multiple layers of spunbonded web, multiple layers of meltblown web, multiple layers of bonded carded web or any other suitable combination or mixtures thereof, as described in U.S. Pat. No. 4,965,122, which is incorporated by reference.

As used herein, the term "percent neckdown" refers to the ratio determined by measuring the difference between the pre-necked dimension (width) and the necked dimension (width) of a neckable material and then dividing that difference by the pre-necked dimension of the neckable material.

As used therein, the term "percent stretch" refers to the ratio determined by measuring the increase in the stretched dimension (in any direction) and dividing that value by the original dimension (in the same direction) i.e., (increase in stretched dimension/original dimension)×100.

As used herein, the term "composite elastic necked bonded material" refers to a material having an elastic sheet joined to a necked material at least at two places. The elastic sheet may be joined to the necked material at intermittent points or may be completely bonded thereto. The joining is accomplished while the elastic sheet and the necked material are in juxtaposed configuration. The composite elastic necked-bonded material is elastic in a direction generally parallel to the direction of neckdown of the necked material and may be stretched in that direction to the breaking point of the necked material. A composite elastic necked-bonded material may include more than two layers. For example, the elastic sheet may have necked material joined to both of its sides so that a three-layer composite elastic necked-bonded material is formed having a structure of necked material/elastic sheet/necked material. Additional elastic sheets, necked material layers, and/or inherently extendible materials such as bonded carded webs may be added. Other combinations of elastic sheets and necked materials may be used, for instance, as indicated in U.S. Pat. No. 5,336,545, which is incorporated by reference.

As used herein, the term "polymer" generally includes, but is not limited to homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

As used herein, the terms "selectively" encompass the terms "only" and "to a greater extent."

As used herein, the term "consisting essentially of" does not exclude the presence of additional materials or process steps which do not significantly affect the desired characteristics of a given composition or product Exemplary materials of this sort would include, without limitation, pigments, antioxidants, stabilizers, surfactants, waxes, flow promoters, solvents, particulates and materials added to enhance processability of the composition.

As used herein, the term "comprising" opens the claim to inclusion of additional materials or process steps other Man those recited.

SUMMARY OF THE INVENTION

The present invention is directed to a neckable nonwoven material having cross-directional nonuniformity which facilitates easier necking in the central region of the nonwoven web than in the two edge regions of the nonwoven web, and/or which selectively retards necking in the edge regions relative to the central region. The easier necking in the central region compared to the edge regions results in selectively greater than normal necking in the central region, sufficient to totally or partially offset the greater necking in the edge regions which inherently results from use of a conventional necking process. The cross-directional nonuniformity resulting in easier necking in the central region can be achieved by varying the chemical (i.e., polymer) composition and/or physical characteristics of the central region relative to the two edge regions or vice versa.

The present invention is also directed to necked nonwoven webs and laminates having more uniform necking and more uniform basis weights and elongation in the cross direction, made using the neckable nonwoven material of the invention.

Many nonwoven webs, including spunbond webs, are manufactured using an interfiber bonding process which bonds the adjacent fibers together at various locations according to a bonding pattern. In one embodiment of the invention, the cross-directional nonuniformity of the neckable nonwoven material is accomplished by varying the interfiber bond pattern between the central region and the two edge regions in a manner which facilitates selectively easier necking in the central region. This can be accomplished by providing a lower percentage of interfiber-bonded area in the central region than in the two edge regions. This, in turn, can be accomplished by a) providing bond patterns which result in more free space between adjacent bonds in the central region than in the two edge regions, and/or b) varying the bonding intensity by bonding the central region at lower temperature and/or pressure than are used to bond the edge regions.

In another embodiment of the invention, the physical properties of the fibers are varied between the central region and the two edge regions of the nonwoven material, to facilitate easier necking in the central region. For instance, fibers which are thinner (with lower fiber denier) may be provided in one region and fibers which are thicker (with higher fiber denier) may be provided in the other region. Also, fibers which are more randomly or cross-directionally oriented may be provided in the central region, and fibers which are more machine-direction oriented may be provided in the two edge regions. Also, fibers which are more circular may be provided in the central region, and fibers which are less circular (have different shapes) may be provided in the two-edge regions. Also, fibers which are less compact (have lower bulk density) may be provided in the central region, and fibers which are more compact (have higher bulk density) may be provided in the two edge regions. Also, fibers which are crimped may be provided in the edge regions but not in the central region, to selectively reduce necking in the edge regions relative to the central region. Also, fibers which have been electrostatically treated following extrusion to cause better alignment may be provided in the two edge regions, and fibers which have not been electrostatically treated (and are less aligned) may be provided in the central region.

In another embodiment of the invention, the chemical (i.e., polymer) composition of the fibers in the central region is varied from the polymer composition of the fibers in the two edge regions. Polymer fibers having lower stiffness moduli generally neck more easily, and are more suitable for the central region. For instance, polypropylene fibers may be provided in the edge regions, while the central region may be provided with a) polypropylene-polyethylene copolymer fibers, b) polyethylene fibers, c) mixtures of polypropylene fibers with polyethylene fibers, d) fibers made from blends of polypropylene and polyethylene, and/or e) polyethylene-polypropylene bicomponent fibers.

DETAILED DESCRIPTION OF THE PRESENTLY PREFERRED EMBODIMENTS

Figure 1:
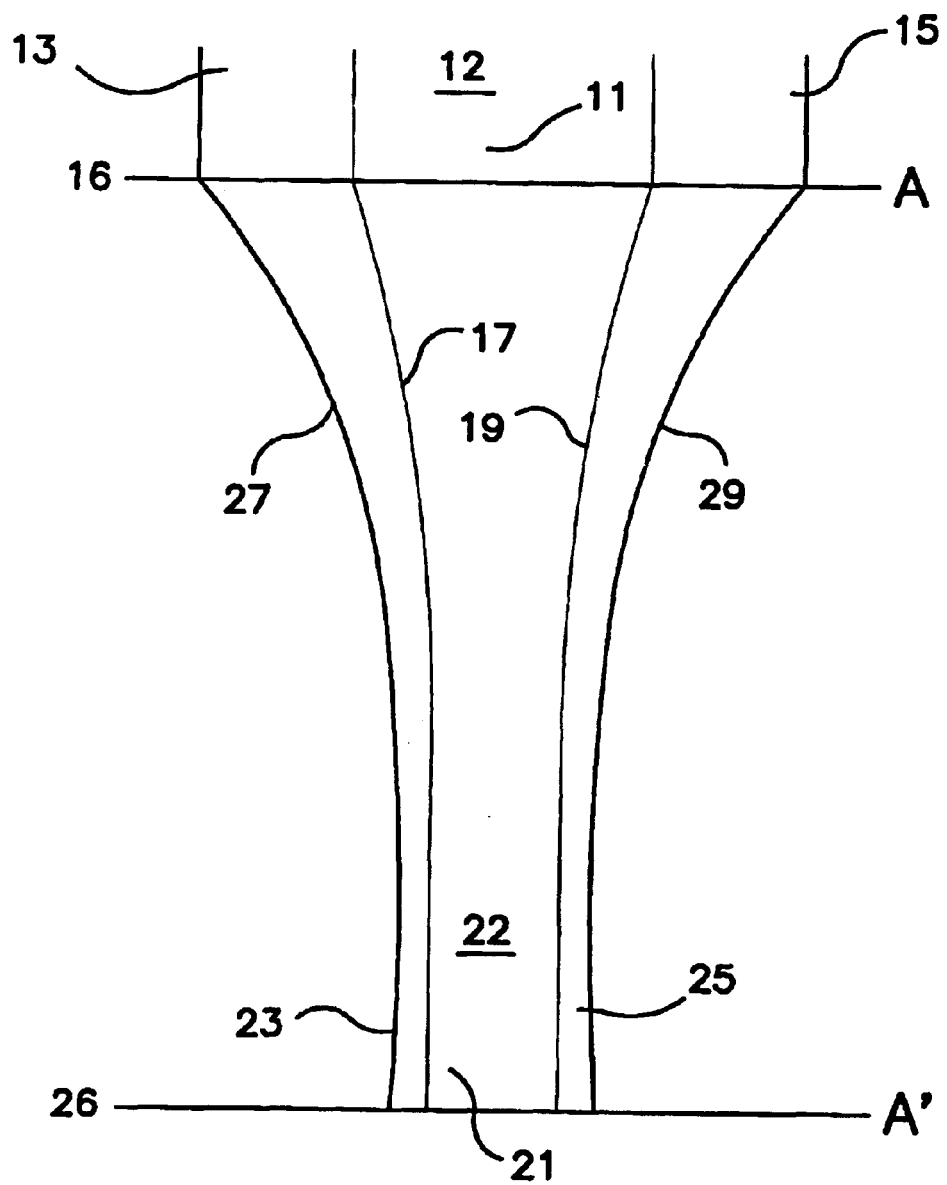
FIG. 1 is a schematic illustration of a conventional necking process, as described above.

Referring again to FIG. 1, a neckable nonwoven web 12 has a central region 11 and two end regions 13 and 15. The central region 11 has different physical properties and/or polymer composition than the two end regions 13 and 15, so that the central region has relatively easier necking.

As explained above, the central region is defined as the central 70% of the lateral width of the nonwoven web, and the two edge regions are defined as the outermost 15% of the lateral width on both sides of the central region. However, this does not mean that the boundaries between the nonwoven fibers which are selectively easier to neck, and the fibers which are harder to neck, must occur precisely at the edges 17 and 19 of the central region. These boundaries may occur inward or outward of the edges 17 and 19 of the central region, so long as the central region is, on average, easier to neck than the two edge regions.

For instance, the boundaries between fibers which are selectively easier to neck and those which are harder to neck may be located about 2% to about 40% the total distance (based on 100% total lateral width) inward from edges 27 and 29 of the nonwoven web 12, suitably about 5% to about 30% of the total distance inward from edges 27 and 29, desirably about 10% to about 25% of the total distance inward from edges 27 and 29. For a homogeneous nonwoven web, the portions which neck in more constitute roughly the outer 6 inches of the width on both sides of the nonwoven web, regardless of the starting web width. Thus, for purposes of the invention, the boundaries between fibers which are easier and harder to neck may desirably be about 6 inches from the edges of the starting material.

Alternatively, the physical properties and/or polymer composition may vary in a gradient fashion inward from the edges 27 and 29, with no precise boundary between nonwoven fibers which are selectively easier to neck and those which are harder to neck. Regardless of whether there are boundaries or gradients, and regardless of where the boundaries are placed the central region 11 of the nonwoven web 12 will, on average, be easier to neck than the two edge regions 13 and 15.

In one embodiment of the invention, the interfiber bond pattern between the central region and two edge regions is varied in a way which facilitates easier necking in the central region. For instance, the central region may have a lower percentage of interfiber bonding (based on the planar area of the nonwoven fabric) than the two edge regions. Nonwoven fabrics suitable for necking typically have interfiber bond areas of about 1–50%. In accordance with the invention, the central region 11 may have an overall interfiber bond area which is at least about 3% less, suitably at least about 5% less, desirably at least about 7% less than the overall bond area of the two edge regions 13 and 15. For example, if the two edge regions 13 and 15 (defined as the outer 15% on each side of nonwoven web 12) have an average bond area of 20%, then the central region 11 (defined as the central 70% of the nonwoven web 12) should have an average bond area of 17% or less, suitably 15% or less, desirably 13% or less. One way to provide the edge regions 13 and 15 to selectively greater bonding is to subject the edge regions selectively to a hot air knife or similar secondary bonding process, after the nonwoven web has been formed and uniformly bonded according to conventional manufacturing techniques. Hot air knives are described in U.S. Pat. No. 5,707,468 to Arnold et al., which is incorporated by reference. Also, as explained above, the original bonding in the central region may be performed with lower temperature and/or pressure than in the two end regions.

Alternatively, the central region 11 may be provided with a relatively less restrictive bond pattern, and the two edge regions 13 and 15 may be provided with a relatively more restrictive bond pattern, between the nonwoven fibers. For purposes of necking, a less restrictive bond pattern may be one whose individual bonds are elongated and oriented more in the machine direction. A more restrictive bond pattern may be one whose individual bonds are elongated and oriented more in the cross direction. Elongated bond points may have a rectangular or elliptical shape, for instance, and may have an aspect ratio of at least about 2:1, desirably at least about 4:1. In one embodiment, bond points having an aspect ratio of 4:1 may be oriented in the machine direction in the central region 11, and may be oriented in the cross direction in the two edge regions 13 and 15. The orientation may shift all at once, or incrementally, between the central region and the two edge regions. In another embodiment, the central region may have a point bond pattern with widely spaced, larger points or dots, and the edge regions may have a dot bond pattern with more closely spaced, smaller points or dots. In either case, the average percent bond area may be the same for the central region and two edge regions, and the central region will have relatively easier necking.

Alternatively, the central region 11 may be provided with thinner nonwoven fibers (of smaller average denier) than the nonwoven fibers in the two edge regions 13 and 15. To accomplish selectively easier necking in the central region, the fibers in the central region 11 should have an average fiber denier which is at least about 5% less, suitably at least about 10% less, desirably at least about 20% less than the average denier of the fibers in the two edge regions 13 and 15. For example, if the average fiber denier in the two edge regions 13 and 15 is 5.0, then the average fiber denier in the central region 11 should be 4.75 or less, suitably 4.5 or less, desirably 4.0 or less. Fibers with lower average denier are less stiff, more pliable, and consequently easier to neck, than fibers of higher average denier. The different deniers may be provided using spinneret dies having narrower and wider openings in the central and edge regions, respectively.

Alternatively, the central region 11 may be provided with fibers which are more randomly or cross-directionally oriented, and the two edge regions 13 and 15 may be provided with fibers which are more machine direction oriented. For instance, when the nonwoven (e.g., spunbond or meltblown) web is manufactured, the edge regions may be subjected to higher velocity entrainment and quenching air streams than the central region, as the fibers exit the spinneret die. The higher velocity air causes greater straightening out (machine direction orienting) of fibers in the edge regions, relative to the central region.

Alternatively, the central region 11 may be provided with fibers which on average, are more round, and the edge regions 13 and 15 may be provided with fibers which, on average, are less round (more shaped). The aspect ratio of a fiber is a ratio of the widest fiber diameter to the narrowest fiber diameter. Completely round fibers have an aspect ratio of 1.0. To achieve selectively easier necking in the central region, the average aspect ratio of fibers in the central region 11 should be at least about 0.5 less, suitably at least about 0.75 less, desirably at least about 1.0 less than the average aspect ratio of fibers in the edge regions 13 and 15. Round fibers are believed to be more prone to necking, and less prone to physical deformation or stretching, than fibers which are flat or shaped.

Alternatively, the central region may be provided with fibers which are less compact, and have lower average bulk density, than fibers in the edge regions. To accomplish selectively easier necking in the central region, the central region 11 should have an average bulk density that is at least about 5% less, suitably at least about 10% less, desirably at least about 20% less than the average bulk density of the two edge regions 13 and 15. Fibers of lower bulk density generally have more space in between them, and are easier to displace and neck, than more compact fibers of higher bulk density. One way to vary the bulk density in the desired fashion is to selectively subject the edge regions 13 and 15 to a compaction process. This can be accomplished by subjecting the edge regions selectively to a pressurized calendering process, or by subjecting the entire nonwoven fabric to a calendering process having rollers shaped to provided relatively higher pressure in the edge regions.

Alternatively, the edge regions 13 and 15 may be provided with nonwoven fibers which are crimped, and the central region 11 may be provided with fibers which are less crimped or not crimped (or with mixtures of crimped and non-crimped fibers). The crimped fibers should have a degree of crimping of at least four crimps per inch, suitably at least six crimps per inch, desirably at least ten crimps per inch. Fibers having zero to less than four crimps per inch are considered to be not crimped, for purposes of this invention. Fibers which are crimped have less tendency to neck in, because these fibers must substantially straighten out before they experience any significant necking tension. Already straight fibers buckle around each other, neck at an earlier stage, and ultimately neck more. To achieve selectively easier necking in the central region 11, the central region 11 may be provided with fibers at least 60% of which are not crimped, and the edge regions 13 and 15 may be provided with fibers at least 60% of which are crimped. Alternatively, the central region may be provided with fibers none of which are crimped, while the edge regions are provided with fibers at least 20% of which are crimped. Regardless of the percentages selected, the difference between the percentage of crimped fibers in the central region and the percentage of fibers in the two edge regions should be at least about 10%, desirably at least about 20%, with the higher percentage of crimped fibers existing in the edge regions.

Alternatively, the edge regions 13 and 15 may be provided with fibers that are generally more aligned than the fibers in the central region 11. This may be accomplished by electrostatically (e.g., corona) treating the fibers in the edge regions after they are extruded from a spinneret, before they contact a forming conveyor. The corona treatment of fibers in the edge regions only causes them to be electrostatically attracted to each other and, thus, more aligned.

In another embodiment of the invention, the polymer composition of the nonwoven fibers in the central region 11 is varied from the polymer composition of the nonwoven fibers in the two edge regions 13 and 15, so that the fibers in the central region have, on average, less stiffness (lower moduli) than the fibers in the two edge regions. To achieve selectively easier necking in the central region, the central region 11 may be provided with fibers at least 60% of which have a first polymer composition, and the edge regions 13 and 15 may be provided with fibers at least 60% of which have a second polymer composition, with the first polymer composition having a lower modulus than the second composition. Alternatively, the central region may be provided with fibers entirely having the first composition, and the edge regions may be provided with fibers at least 20% of which have the second composition. Regardless of the percentages selected, the difference between the percentage of fibers in the central region having the first composition of lower modulus, and the percentage of fibers in the edge regions having the first composition, should be at least about 20%, suitably at least about 30%, desirably at least about 50%.

For instance, nonwoven web 12 may be formed from a combination of substantially crystalline polypropylene fibers (formed from polypropylene or a random propylene-ethylene copolymer containing up to 10% by weight ethylene) and amorphous or semi-crystalline propylene-ethylene copolymer fibers containing more than 10% ethylene, wherein the difference in ethylene contents between the two polymer types is at least 5% based on total polymer weight. In accordance with the invention, the central region should contain at least 20% by weight more of the amorphous or semi-crystalline copolymer fibers (based on the total weight of the fiber mixture in the central region) than the two edge regions (which would contain correspondingly higher amounts of the substantially crystalline polypropylene fibers). Suitably, the central region will contain at least 30% by weight more of the amorphous or semi-crystalline copolymer fibers, desirably at least 50% more, than the two edge regions.

Similarly, nonwoven web 12 may be formed from a combination of substantially crystalline polypropylene fibers as defined above, and polypropylene/polyethylene bicomponent fibers. The bicomponent fibers each contain from 10–90% by weight polypropylene and 10–90% by weight polyethylene in two distinct phases, suitably 25–75% by weight of each component in two distinct phases. The bicomponent fibers may have a polypropylene core and a polyethylene sheath, or may have a side-by-side configuration with polypropylene on one side and polyethylene on the other side, or may have an "island-in-the-sea" configuration with a discontinuous phase of one polymer and a continuous "matrix" phase of the other. As explained above, the central region will contain at least 20% more, suitably at least 30% more, desirably at least 50% more of the bicomponent fibers based on the total fiber weight in the central region, than is contained in the two edge regions. If the edge regions contain 100% polypropylene fibers and 0% bicomponent fibers, for instance, the central region should contain at least 20%, suitably at least 30%, desirably at least 50% of the bicomponent fibers. If the edge regions contain 70% polypropylene fibers and 30% bicomponent fibers, the central region should contain at least 50%, suitably at least 60%, desirably at least 80% of the bicomponent fibers.

Regardless of which of the above embodiments or variants is selected, the effect is to make the central region 11 of nonwoven web 12 relatively easier to neck than the edge regions 11 and 13. This results in selectively greater necking in the central region, sufficient to effect the greater necking in the edge regions which inherently occurs during the conventional necking process. The resulting necked nonwoven web 22 should have a substantially uniform basis weight. Specifically, the average necked basis weight of the central region should be within about ±7% of the average basis weight of the two edge regions, suitably within about ±5% of the average basis weight of the two edge regions, desirably within about ±3% of the average basis weight of the two edge regions, when the starting nonwoven web is stretched to at least about 1.2 times, desirably about 1.25 times its initial length in the machine direction to cause the necking.

Another test for uniformity of the necked nonwoven web is based on measurements of elongation at break in the cross direction, measured using ASTM D5034. Samples measuring three inches in the cross direction and one inch in the machine direction are cut inward beginning at both side edges of the necked nonwoven web. A similar sample is cut precisely from the center of the necked nonwoven web. Each of the samples is placed in an INSTRON® tester so that one inch of sample is clamped within each of the jaws, leaving one inch of cross-directional width which can be stretched when the jaws are extended from each other.

Again, the necked nonwoven web should have a necked machine direction length which is at least about 1.2 times, desirably about 1.25 times its initial starting length. For the prior art necked nonwoven webs, there was substantial variation in cross-directional elongation at break between the central and edge samples. The edge samples, which experienced greater necking, had significantly higher cross directional elongation at break than the central sample. For purposes of the invention, both of the edge samples should have a cross-directional elongation at break which is not more than 20% higher, suitably not more than 10% higher, desirably not more than 5% higher, than the cross-directional elongation at break of the central sample. For purposes of this specification and the accompanying claims, this percentage difference between the cross-directional elongation at break of the central sample and the highest cross-directional elongation at break of the two edge samples is defined and referred to as "the cross-directional elongation at break nonuniformity index." Of course, the necked nonwoven web should have a necked width of at least about 9 inches, desirably at least about 15 inches, in order for this measurement to apply.

Other aspects of the process of FIG. 1 are conventional, and are described above in the "Background Of The Invention." A heating apparatus (not shown), such as an oven, may be positioned between the first nip 16 and the second nip 26. The web typically begins necking before entering the oven. The oven can be used to aid in necking and heat setting the entire nonwoven web, resulting in a necked nonwoven web 22 which is reversibly necked. The temperature inside the oven should be high enough to soften the nonwoven fibers and increase their pliability, but not so high as to either a) melt the fibers, or b) soften the fibers to such an extent that the necking process causes significant stretching, narrowing and/or breaking of individual nonwoven fibers. When the nonwoven fibers are made from a polyolefin, for instance, the highest temperature reached by the nonwoven web inside the oven should be at least about 20° C. below the melting temperature of the fibers, suitably at least about 25° C. below the melting temperature of the fibers, desirably at least about 30° C. below the melting temperature of the fibers. Optimal necking temperatures are typically about 30–60° C. below the melting temperature of the fibers. When the nonwoven web is a spunbond polypropylene web, for instance, a desired necking temperature is about 105–140° C.

The neckable material 12 may be formed by known nonwoven processes, such as, for example, meltblowing processes, spunbonding processes or bonded carded web processes and passed directly through the nip 16 without first being stored on a supply roll.

The neckable material 12 may be a nonwoven material such as, for example, spunbonded web, meltblown web or bonded carded web. If the neckable material 12 is a web of meltblown fibers, it may include meltblown microfibers. The neckable material 12 is made from any material that can be treated while necked so that, after treatment, upon application of a force to extend the necked material to its pre-necked dimensions, the material recovers generally to its necked dimensions upon termination of the force. A method of treatment is the application of heat. Certain polymers such as, for example, polyolefins, polyesters and polyamides may be heat treated under suitable conditions to impart such memory. Exemplary polyolefins include one or more of polyethylene, polypropylene, polybutene, ethylene copolymers, propylene copolymers and butene copolymers. Polypropylenes that have been found useful include, for example, polypropylene available from the Himont Corporation under the trade designation PF-304, polypropylene available from the Exxon-Mobil Chemical Company under the trade designation Escorene® PD-3445, and polypropylene available from the Shell Chemical Company under the trade designation DX 5A09. Polyethylenes may also be used, including ASPUN® 6811A and 2553 linear low density polyethylenes from the Dow Chemical Company, as well as various high density polyethylenes. Chemical characteristics of these materials are available from their respective manufacturers.

In one embodiment of the present invention, the neckable material 12 is a multilayer material having, for example, at least one layer of spunbonded web joined to at least one layer of meltblown web, bonded carded web or other suitable material. For example, the neckable material 12 may be a multilayer material having a first layer of spunbonded polyolefin having a basis weight from about 0.2 to about 8 ounces per square yard (osy), a layer of meltblown polyolefin having a basis weight from about 0.1 to about 4 osy, and a second layer of spunbonded polyolefin having a basis weight of about 0.2 to about 8 osy.

Alternatively, the neckable material 12 may be single layer of material such as, for example, a spunbonded web having a basis weight of from about 0.2 to about 10 osy or a meltblown web having a basis weight of from about 0.2 to about 8 osy.

The neckable material 12 may also include a composite material made of a mixture of two or more different fibers or a mixture of fibers and particulates. Such mixtures may be formed by adding fibers and/or particulates to a gas stream in which meltblown fibers are carried so that an intimate entangled commingling of meltblown fibers and other materials (e.g., wood pulp, staple fibers or particulates such as, for example, superabsorbent materials) occurs prior to collection of the fibers upon a collecting device to form a coherent web of randomly dispersed meltblown fibers and other materials such as disclosed in U.S. Pat. No. 4,100,324, the disclosure of which is hereby incorporated by reference.

If the neckable material 12 is a nonwoven web of fibers, the fibers should be joined by interfiber bonding using one or more of the bonding processes described in the foregoing "DEFINITION" of interfiber bonding.

The relation between the original width of the neckable material 12 to its width after tensioning determines the stretch limits of the reversibly necked material 22. For example, with reference to FIG. 1 if it is desired to prepare a reversibly necked material that can be stretched to a 150 percent elongation (i.e., 250 percent of its necked width) and can recover to within about 25 percent of its neckable width, a neckable material having a width "A" such as, for example, 250 cm, is tensioned so that it necks down to a width A' of about 100 cm for a percent neck or percent neckdown of about 60 percent. While tensioned, it is heat treated to maintain its reversibly necked configuration 22. The resulting reversibly necked material has a width A' of about 100 cm and is stretchable to at least the original 250 cm dimension "A" of the neckable material for an elongation or percent stretch of about 150 percent. The reversibly necked material may return to within about 25 percent of its necked width of about 100 cm (i.e., to a width of about 125 cm) after release of the stretching force for a recover of about 83 percent.

The claims of the present invention are meant to encompass uniformly necked materials which are adapted to stretch at least 75 percent in the cross direction, and recover at least 50 percent when stretched by 75% and then relaxed.

Figure 2:
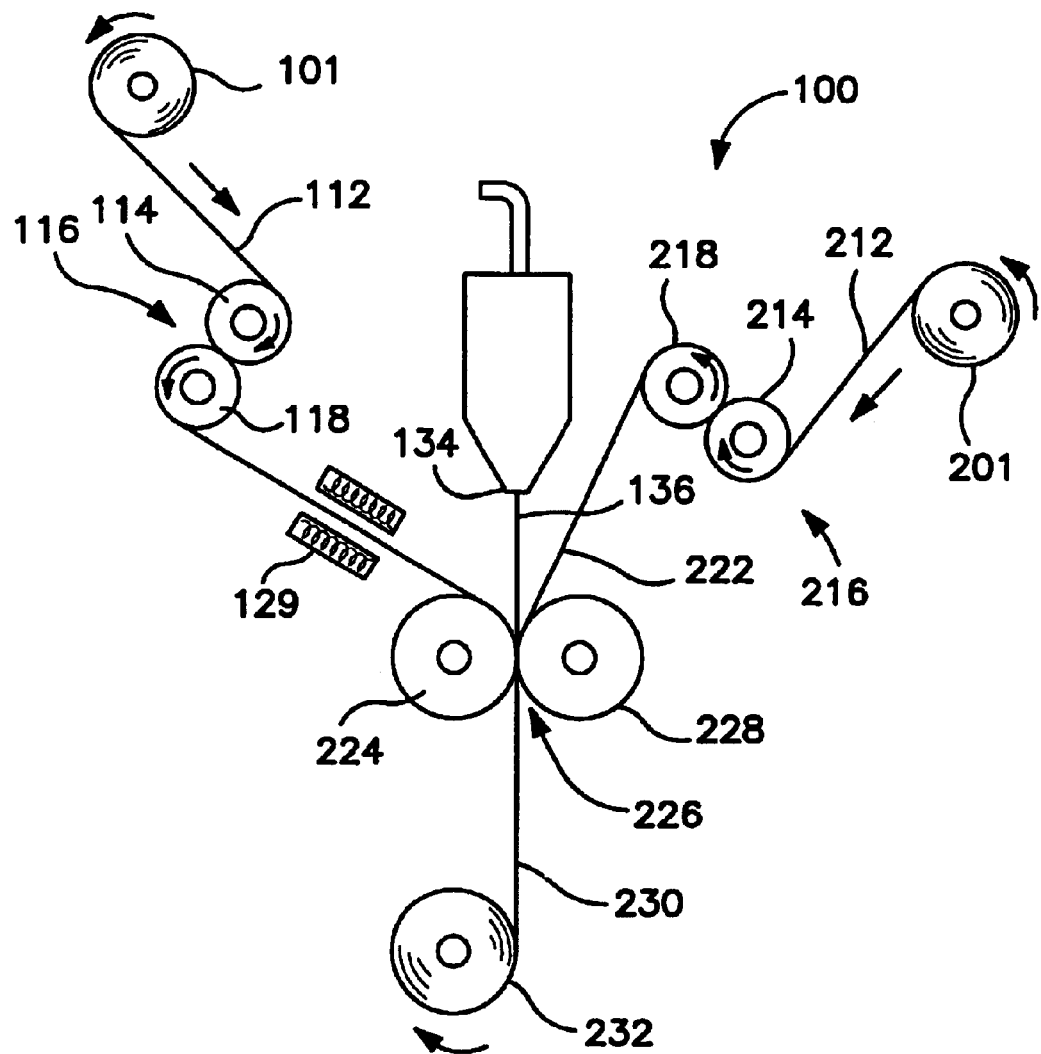
FIGS. 2 and 3 are schematic illustrations of processes for making neck-bonded laminates.

FIG. 2 schematically illustrates a process 100 for preparing a neck-bonded laminate of the invention, including two necked spunbonded webs and an elastomeric film between them. In this process, the elastomeric film is extruded between the two necked spunbond webs. The central regions of the spunbond webs have a composition and/or physical properties designed to selectively enhance necking in those regions.

Referring to FIG. 2, first and second spunbond webs 112 and 212 are unwound from supply rolls 101 and 201. First spunbond web 112 passes through a first nip 16, including nip rollers 114 and 118, turning at a first surface velocity; and through a second nip 226, including nip rollers 224 and 228, turning at a second surface velocity which is higher than the first surface velocity. Necking of the spunbond web between the first nip 116 and second nip 226 is effected by the different surface velocities, and with the aid of oven 129. The oven 129 heats the entire nonwoven web to a temperature about 20–60° C. below the melting temperature of the spunbond fibers.

Second spunbond web 212 passes through a third nip 216 which includes nip rollers 214 and 218, turning at a third surface velocity; and through the above-described second nip 226, including nip rollers 224 and 228, turning at the second surface velocity. The second surface velocity is higher than the third surface velocity, thereby effecting necking between the nips 216 and 226. As illustrated, the entire nonwoven web 212 is not heated using an oven. However, the second spunbond web 212 (like the first spunbond web 112) has a central region having physical properties and/or a polymer composition designed to selectively increase the necking of the central region relative to the two edge regions.

To make the neck bonded laminate 230, a molten elastomer is extruded through a die tip 134 to form an extruded elastomeric film 136. The extruded elastomeric film 136 is deposited directly between the tensioned necked spunbond webs 122 and 222, and all three layers are brought together in the nip 226. The extruded elastomeric film 136 may contact the necked materials 122 and 222 within about 0.1–1.0 second after the film leaves the die tip 134, suitably within about 0.25–0.5 seconds, desirably within about 0.3–0.45 seconds.

The film of elastomer may be extruded at a temperature of from about 180–300° C., suitably about 200–250° C.

Light pressure is applied in the nip 226 to thermally bond the elastomeric film 136 (in a relatively untensioned state) to the tensioned necked, nonwoven webs 212 and 222. The nip rollers 224 and 228 may or may not be patterned, need not be heated, and may be chilled (e.g., to a temperature of about 10–30° C.) so as to quench the elastomeric film between the necked spunbond webs. The resulting neck-bonded laminate 230 can be stretched in the cross direction due to the extendibility of the necked nonwoven webs. Upon relaxation, the laminate 230 will return substantially to its original manufactured configuration due to the retractive influence of the elastomeric film. Further details pertaining to the manufacture of neck-bonded laminates using a molten elastic film are provided in U.S. Pat. No. 5,514,470 to Haffner et al., which is incorporated by reference.

Figure 3:
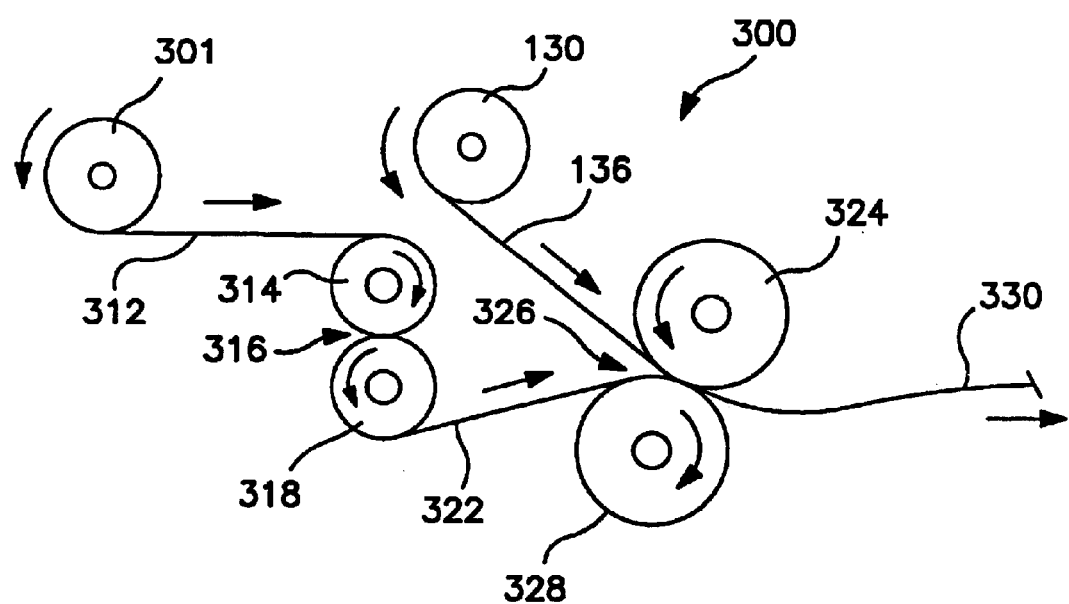

FIG. 3 illustrates an alternative process 300 formaking a laminate of the invention. In this process, a pre-formed extendible or elastic film is combined with a necked nonwoven web. An extendible film is one which can be stretched like an elastic film, but does not necessarily retract. The central region of the nonwoven web 312 has a polymer composition and/or physical properties designed to selectively increase the necking in the central region relative to the two edge regions.

Referring to FIG. 3, nonwoven web 12 (for example, a spunbond-meltblown-spunbond laminate) is unwound from supply roll 301. Nonwoven web 12 is passed through a first nip 316, including nip rollers 314 and 318 turning at a first surface velocity; and a second nip 326, including nip rollers 324 and 328 turning at a second surface velocity which is higher than the first surface velocity, to form necked nonwoven web 322.

An extendible or elastomeric film 136 is unwound from a supply roll 130 and is combined, in a substantially untensioned state, with the tensioned, necked nonwoven web 322 by passing both materials through the second nip 326. One or both of the rollers 324 and 328 may be heated using techniques well known in the art, to effect thermal bonding between the extendible or elastic film and the necked nonwoven web. Further details of a process for joining a pre-fabricated film to a necked nonwoven web are provided in U.S. Pat. No. 5,883,028 to Morman et al., which is incorporated by reference. The resulting laminate 330 has cross-directional extendibility due to the influence of the necked nonwoven web. When the extension force is removed, the laminate 330 will return substantially to its manufactured configuration if the film is elastic. If the film is merely extendible but not elastic, the laminate will not significantly recover.

The film 136 (FIG. 2 or 3) may be made from any material which may be manufactured in sheet form. Generally, any suitable extendible or elastomeric film forming resins or blends containing the same may be utilized for the film.

For example, the film 136 may be made from elastic block copolymers having the general formula A-B-A' where A and A' are each a thermoplastic polymer endblock which contains a styrenic moiety such as a poly (vinyl arene) and where B is an elastomeric polymer midblock such as a conjugated diene or a lower alkene polymer. The film 136 may be formed from, for example, (polystyrene/poly (ethylenebutylene)/polystyrene) block copolymers available from the Shell Chemical Company under the trademark KRATON G. One such block copolymer may be, for example, KRATON G-1657.

Other exemplary elastomeric materials which may be used include polyurethane elastomeric materials such as, for example, those available under the trademark ESTANE from B. F. Goodrich & Co., polyamide elastomeric materials such as, for example, those available under the trademark PEBAX from the Rilsan Company, and polyester elastomeric materials such as, for example, those available under the trade designation Hytrel from E. I. DuPont De Nemours & Company. Formation of elastic sheets from polyester elastic materials is disclosed in, for example, Morman et al. U.S. Pat. No. 4,741,949, hereby incorporated by reference.

A polyolefin may be used alone to make an extendible film, or may be blended with the elastomeric polymer to improve the processability of the film composition. The polyolefin must be one which, when subjected to an appropriate combination of elevated pressure and elevated temperature conditions, is extrudable, alone or in blended form. Useful polyolefin materials include, for example, polyethylene, polypropylene and polybutene, including ethylene copolymers, propylene copolymers and butene copolymers. A particularly useful polyethylene may be obtained from the U.S.I. Chemical Company under the trade designation Petrothaene NA601 (also referred to herein as PE NA601 or polyethylene NA601). Two or more of the polyolefins may be utilized. Extrudable blends of elastomeric polymers and polyolefins are disclosed in, for example, Wisneski et al. U.S. Pat. No. 4,663,220, hereby incorporated by reference.

The film 136 may also be a pressure sensitive elastomer adhesive sheet. For example, the elastic material itself may be tacky or, alternatively, a compatible tackifying resin may be added to the extrudable elastomeric compositions described above to provide an elastomeric sheet that can act as a pressure sensitive adhesive, e.g., to bond the elastomeric sheet to a tensioned, necked nonelastic web. In regard to the tackifying resins and tackified extrudable elastomeric compositions, note the resins and compositions as described in J. S. Keiffer and T. J. Wisneski U.S. Pat. No. 4,789,699, filed 15 Oct. 1986 for "Ambient Temperature Bondable Elastomeric Nonwoven Web," the disclosure of which is hereby incorporated by reference.

Any tackifier resin can be used which is compatible with the elastomeric polymer and can withstand the high processing (e.g., extrusion) temperatures. If blending materials such as, for example, polyolefins or extending oils, are used, the tackifier resin should also be compatible with those blending materials. Generally, hydrogenated hydrocarbon resins are preferred tackifying resins, because of their better temperature stability. REGALREZ™ and ARKON™ P series tackifiers are examples of hydrogenated hydrocarbon resins. ZONATAKT™ 501 lite is an example of a terpene hydrocarbon. REGALREZ hydrocarbon resins are available from Hercules Incorporated. ARKON P series resins are available from Arakawa Chemical (U.S.A.) Incorporated. Of course, the present invention is not limited to use of such three tackifying resins, and other tackifying resins which are compatible with the other components of the composition and can withstand the high processing temperatures, can also be used.

A pressure sensitive elastomer adhesive may include, for example, from about 40 to about 80 percent by weight elastomeric polymer, from about 5 to about 40 percent polyolefin and from about 5 to about 40 percent resin tackifier. For example, a particularly useful composition included, by weight, about 61 to about 65 percent KRATON G-1657, about 17 to about 23 percent Polyethylene NA-601, and about 15 to about 20 percent REGALREZ 1126.

The film 136 may also be a multilayer material in that it may include two or more individual coherent film layers. If the film is elastic, it may be stretched in the machine direction before being bonded to the necked nonwoven web 322, to form a laminate which is elastic in both the machine direction and the cross direction. A similar laminate is disclosed in U.S. Pat. No. 5,116,662, which is incorporated by reference.

The laminates of the invention have improved basis weight uniformity due to the improved uniformity of the necked nonwoven web components. When the necked nonwoven webs are stretched to at least about 1.2 times, desirably about 1.25 times their initial machine direction length to cause necking, a laminate of the invention should have an average basis weight in its central region (defined as the central 70% of the width of the laminate) which is within about ±7% of the average basis weight of the two edge regions (defined as the outer 15% of the width on each side of the laminate). Suitably, the average basis weight of the central region should be within about ±5% of the average basis weight of the two edge regions. Desirably, the average basis weight of the central region should be within about ±3% of the average basis weight of the two edge regions.

While the embodiments of the invention disclosed herein are presently preferred, various modifications and improvements can be made without departing from the invention. The scope of the invention is indicated in the appended claims, and all changes that fall within the meaning and range of equivalents are intended to be embraced therein.

We claim:

1. A necked nonwoven web, comprising:
a central region and two edge regions;
the central region including a plurality of first fibers;
the two edge regions including a plurality of second fibers different from the first fibers;
the fibers in the central and edge regions being selected so as to provide selectively easier necking in the central region.

2. The necked nonwoven web of claim 1, wherein the first fibers have a first areal percentage of interfiber bonding, and the second fibers have a second areal percentage of interfiber bonding, the second percentage being lower than the first percentage.

3. The necked nonwoven web of claim 2, wherein the first areal percentage of interfiber bonding is at least 3% less than the second areal percentage of interfiber bonding.

4. The necked nonwoven web of claim 2, wherein the first areal percentage of interfiber bonding is at least 5% less than the second areal percentage of interfiber bonding.

5. The necked nonwoven web of claim 2, wherein the first areal percentage of interfiber bonding is at least 7% less than the second areal percentage of interfiber bonding.

6. The necked nonwoven web of claim 1, wherein the central region comprises elongated interfiber bonds oriented more in a machine direction, and the two edge regions comprise interfiber bonds oriented more in a cross direction.

7. The necked nonwoven web of claim 1, wherein the central region comprises interfiber point bonds that are relatively large and widely spaced, and the two edge regions comprise interfiber point bonds that are relatively small and closely spaced.

8. The necked nonwoven web of claim 1, wherein the fibers in the central region have a first average denier, and the fibers in the edge regions have a second average denier, the first average denier being smaller than the second average denier.

9. The necked nonwoven web of claim 8, wherein the first average denier is at least 5% smaller than the second average denier.

10. The necked nonwoven web of claim 8, wherein the first average denier is at least 10% smaller than the second average denier.

11. The necked nonwoven web of claim 8, wherein the first average denier is at least 20% smaller than the second average denier.

12. The necked nonwoven web of claim 1, wherein the fibers in the central region are relatively more randomly or cross-directionally oriented, and the fibers in the two edge regions are relatively more machine-direction oriented.

13. The necked nonwoven web of claim 1, wherein the fibers in the two edge regions are more aligned than the fibers in the central region.

14. The necked nonwoven web of claim 1, wherein the fibers in the central region have a first average aspect ratio, the fibers in the two edge regions have a second average aspect ratio, and the first average aspect ratio is less than the second average aspect ratio.

15. The necked nonwoven web of claim 14, wherein the first average aspect ratio is at least about 0.5 less than the second average aspect ratio.

16. The necked nonwoven web of claim 14, wherein the first average aspect ratio is at least about 0.75 less than the second average aspect ratio.

17. The necked nonwoven web of claim 14, wherein the first average aspect ratio is at least about 1.0 less than the second average aspect ratio.

18. The necked nonwoven web of claim 1, wherein the fibers in the central region have a first average bulk density, the fibers in the two edge regions have a second average bulk density, and the first average bulk density is less than the second average bulk density.

19. The necked nonwoven web of claim 18, wherein the first average bulk density is at least about 5% less than the second average bulk density.

20. The necked nonwoven web of claim 18, wherein the first average bulk density is at least about 10% less than the second average bulk density.

21. The necked nonwoven web of claim 18, wherein the first average bulk density is at least about 20% less than the second average bulk density.

22. The necked nonwoven web of claim 1, wherein the first fibers are not crimped, the second fibers are crimped, and the second fibers are present in the edge regions at a percentage at least 10% higher than in the central region.

23. The necked nonwoven web of claim 22, wherein the second fibers are present in the edge regions at a percentage at least 20% higher than in the central region.

24. The necked nonwoven web of claim 1, wherein the first fibers have a first polymer composition, the second fibers have a second polymer composition different from the first polymer composition, and the fibers in the central region have, on average, less stiffness than the fibers in the two edge regions.

25. The necked nonwoven web of claim 24, wherein the first fibers are present in the central region at a percentage at least about 20% higher than in the two edge regions.

26. The necked nonwoven web of claim 24, wherein the first fibers are present in the central region at a percentage at least 30% higher than in the two edge regions.

27. The necked nonwoven web of claim 24, wherein the first fibers are present in the central region at a percentage at least 50% higher than in the two edge regions.

28. The necked nonwoven web of claim 24, wherein the first fibers comprise an ethylene-propylene copolymer and the second fibers comprise polypropylene.

29. The necked nonwoven web of claim 24, wherein the first fibers comprise polyethylene and the second fibers comprise polypropylene.

30. The necked nonwoven web of claim 24, wherein the first fibers comprise polypropylene/polyethylene bicomponent fibers and the second fibers comprise polypropylene.

31. A necked nonwoven web having a length which is at least about 1.2 times an initial pre-necked length, comprising:
a central region and two edge regions;
the central region including a plurality of first fibers and having a first average basis weight;
the two edge regions including a plurality of second fibers different from the first fibers and having a second average basis weight;
the first basis weight being within about ±7% of the second basis weight.

32. The necked nonwoven web of claim 31, wherein the first basis weight is within about ±5% of the second basis weight.

33. The necked nonwoven web of claim 31, wherein the first basis weight is within about ±3% of the second basis weight.

34. A necked nonwoven web having a necked width of at least about nine inches, a length which is at least about 1.2 times an initial, pre-necked length, and a cross-directional nonuniformity index of not more than 20%.

35. The necked nonwoven web of claim 34, wherein the cross-directional nonuniformity index is not more than 10%.

36. The necked nonwoven web of claim 34, wherein the cross-directional nonuniformity index is not more than 5%.

37. The necked nonwoven web of claim 34, comprising a necked spunbond web.

38. The necked nonwoven web of claim 34, comprising a necked meltblown web.

39. The necked nonwoven web of claim 34, comprising a necked spunbond-meltblown-spunbond web laminate.

40. The necked nonwoven web of claim 34, wherein the first fibers have a first areal percentage of interfiber bonding, and the second fibers have a second areal percentage of interfiber bonding, the second percentage being less than the first percentage.

41. The necked nonwoven web of claim 34, wherein the first fibers have a relatively less restrictive interfiber bond pattern, and the second fibers have a relatively more restrictive interfiber bond pattern.

42. The necked nonwoven web of claim 34, wherein the fibers in the central region have a first average denier, and the fibers in the edge regions have a second average denier, the first average denier being less than the second average denier.

43. The necked nonwoven web of claim 34, wherein the fibers in the central region are relatively more randomly or cross-directionally oriented, and the fibers in the two edge regions are relatively more machine-direction oriented.

44. The necked nonwoven web of claim 34, wherein the fibers in the central region have a first average aspect ratio, the fibers in the two edge regions have a second average aspect ratio, and the first average aspect ratio is less than the second average aspect ratio.

45. The necked nonwoven web of claim 34, wherein the fibers in the central region have a first average bulk density, the fibers in the two edge regions have a second average bulk density, and the first average bulk density is less than the second average bulk density.

46. The necked nonwoven web of claim 34, wherein the first fibers are not crimped, and the second fibers are crimped.

47. The necked nonwoven web of claim 34, wherein the first fibers have a first polymer composition and the second fibers have a second polymer composition different from the first polymer composition.

48. The necked nonwoven web of claim 34, wherein the fibers in the two edge regions are more aligned than the fibers in the central region.

49. A laminate, comprising:

a necked nonwoven web including a central region and two edge regions;

the central region of the web including a plurality of first fibers;

the two edge regions of the web including a plurality of second fibers different from the first fibers; and an elastomeric or extendible film bonded to the necked nonwoven web;

wherein the neck-bonded laminate includes a central region having a first basis weight, and two edge regions having a second basis weight within ±7% of the first basis weight.

50. The neck-bonded laminate of claim 49, comprising two of the necked nonwoven webs, the film being bonded to both necked nonwoven webs.

* * * * *